US012586285B2

(12) United States Patent
Williams et al.

(10) Patent No.: US 12,586,285 B2
(45) Date of Patent: Mar. 24, 2026

(54) METHODS AND SYSTEMS FOR MARKERLESS FACIAL MOTION CAPTURE

(71) Applicants: Mark Douglas John Williams, Vancouver (CA); Lucio Dorneles Moser, Vancouver (CA)

(72) Inventors: Mark Douglas John Williams, Vancouver (CA); Lucio Dorneles Moser, Vancouver (CA)

(73) Assignee: Digital Domain Virtual Human (US), Inc.

(*) Notice: Subject to any disclaimer, the term of this patent is extended or adjusted under 35 U.S.C. 154(b) by 201 days.

(21) Appl. No.: 18/466,735

(22) Filed: Sep. 13, 2023

(65) Prior Publication Data

US 2023/0419583 A1 Dec. 28, 2023

Related U.S. Application Data

(63) Continuation of application No. PCT/CA2022/050360, filed on Mar. 10, 2022.

(Continued)

(51) Int. Cl.
*G06T 7/20* (2017.01)
*G06T 7/00* (2017.01)
(Continued)

(52) U.S. Cl.
CPC ............ *G06T 13/40* (2013.01); *G06T 7/0002* (2013.01); *G06T 7/11* (2017.01); *G06V 40/168* (2022.01);
(Continued)

(58) Field of Classification Search
CPC ......... G06T 13/40; G06T 7/11; G06T 7/0002; G06T 2207/20132; G06T 2207/30168;
(Continued)

(56) References Cited

U.S. PATENT DOCUMENTS 6,554,431 B1 * 4/2003 Binsted .................... H04N 5/74
353/69
8,644,552 B2 * 2/2014 Han .......................... G06T 7/20
382/103

(Continued)

FOREIGN PATENT DOCUMENTS

CN 112381782 B 9/2022
EP 3576020 A1 * 12/2019 ............. G16H 40/20

(Continued)

OTHER PUBLICATIONS

Dominik Sibbing, Markerless Reconstruction and Synthesis of Dynamic Facial Expressions, 2010, Elsevier, Computer Vision and Image Understanding 115, pp. 668-680. (Year: 2010).*

(Continued)

*Primary Examiner* — Cheng Yuan Tseng
(74) *Attorney, Agent, or Firm* — Todd A. Rattray; Oyen Wiggs Green & Mutala LLP

(57) ABSTRACT

A method of preparing a training data set for an artificial intelligence engine operable to convert markerless digital images of a target face into a mapping. The method comprises training an intermediate artificial intelligence by providing markered digital images of one or more skin parts to the intermediate artificial intelligence engine as a source training data set and providing markerless digital images of the one or more skin parts to the intermediate artificial intelligence engine as a target training data set. The intermediate artificial intelligence engine removes markers from markered digital images of the face of a first person to create corresponding synthetic markerless digital images of the face of the first person. The markered digital images of the face of the first person are converted into a mapping. The output training data set comprises the synthetic markerless digital images of the face of the first person and the mapping.

20 Claims, 5 Drawing Sheets

Related U.S. Application Data

(60) Provisional application No. 63/163,004, filed on Mar. 18, 2021.

(51) Int. Cl.
*G06T 7/11* (2017.01)
*G06T 13/40* (2011.01)
*G06V 40/16* (2022.01)

(52) U.S. Cl.
CPC .. *G06V 40/174* (2022.01); *G06T 2207/20132* (2013.01); *G06T 2207/30168* (2013.01); *G06T 2207/30201* (2013.01)

(58) Field of Classification Search
CPC ........ G06T 2207/30201; G06V 40/174; G06V 40/168
See application file for complete search history.

(56) References Cited

U.S. PATENT DOCUMENTS

| | | | | |
|---|---|---|---|---|
| 10,796,480 | B2 * | 10/2020 | Chen | G06V 40/166 |
| 11,037,281 | B2 * | 6/2021 | Shen | G06T 15/50 |
| 11,069,150 | B2 * | 7/2021 | Sminchisescu | G06T 17/20 |
| 11,270,476 | B2 * | 3/2022 | Chen | G06N 20/00 |
| 11,302,064 | B2 * | 4/2022 | Li | G06T 7/50 |
| 11,321,960 | B2 * | 5/2022 | Zhou | H04N 13/257 |
| 11,347,973 | B2 * | 5/2022 | Rhee | G06N 3/088 |
| 11,354,844 | B2 * | 6/2022 | Sagar | G06T 15/503 |
| 11,367,239 | B2 * | 6/2022 | Shysheya | G06V 40/103 |
| 11,379,746 | B2 * | 7/2022 | Rajabizadeh | G06N 20/00 |
| 11,403,874 | B2 * | 8/2022 | Liu | G06F 18/2413 |
| 11,417,053 | B1 * | 8/2022 | Yang | G06N 3/0895 |
| 11,475,711 | B2 * | 10/2022 | Uchida | G06V 40/166 |
| 11,893,681 | B2 * | 2/2024 | Glazistov | G06T 1/00 |
| 12,198,330 | B2 * | 1/2025 | Blau | A61B 90/00 |
| 2012/0306874 | A1 * | 12/2012 | Nguyen | G06V 20/647 345/420 |
| 2020/0093458 | A1 | 3/2020 | Sehnert et al. | |
| 2020/0351228 | A1 * | 11/2020 | Dobrogost | A63F 13/87 |
| 2021/0232926 | A1 * | 7/2021 | Hutter | G06F 18/21 |
| 2021/0237767 | A1 * | 8/2021 | Khoreva | G06N 3/045 |
| 2022/0076119 | A1 * | 3/2022 | Khoreva | G06V 10/764 |
| 2022/0172421 | A1 * | 6/2022 | Moschoglou | G06T 15/00 |

FOREIGN PATENT DOCUMENTS

| | | | | |
|---|---|---|---|---|
| KR | 102128399 | B1 | 6/2020 | |
| WO | WO-2017090815 | A1 * | 6/2017 | A61B 5/00 |

OTHER PUBLICATIONS

Connah Kendrick, Markerless Facial Motion Capture: Deep Learning Approaches on RGBD Data, Manchester Metropolitan University, 2018, pp. 1-196. (Year: 2018).*

G.W. Intyanto, Implement of the Transformation for Markerless Facial Motion Capture in 3D animation, ICCGANT 2020, pp. 1-7. (Year: 2020).*

Sara J. Saito, Markerless Facial Motion Capture, Southern Illinois University, 2015, pp. 1-41. (Year: 2015).*

Zhu et al., "Unpaired Image-to-Image Translation using Cycle-Consistent Adversaria INetworks", Aug. 24, 2020.

Goodfellow et al., "Generative Adversarial Nets", Jun. 10, 2014.

* cited by examiner

85

65

METHODS AND SYSTEMS FOR MARKERLESS FACIAL MOTION CAPTURE

REFERENCE TO RELATED APPLICATIONS

This application is a continuation of Patent Cooperation Treaty (PCT) application No. PCT/CA2022/050360 having an international filing date of 10 Mar. 2022, which in turn claims priority from, and for the purposes of the United States the benefit of 35 USC 119 in relation to, U.S. application No. 63/163,004 filed 18 Mar. 2021 which is hereby incorporated herein by reference.

TECHNICAL FIELD

This application relates to motion capture used for computer-based digital animation and/or the like. Particular embodiments provide methods and systems for markerless facial motion capture used for computer-based digital animation and/or the like.

BACKGROUND

Facial motion capture converts movements of a person's face into a digital mapping. The digital mapping may be employed for the purpose of producing, for example, computer animation of characters for movies, video games and the like. Since the facial movement of the animated character is derived from actual movements of a person's face, the resulting animated character may be more nuanced and believable as compared to animated characters created manually.

The digital mapping associated with facial motion capture may comprise facial geometries and/or values of coordinates or relative positions of reference points on the person's face. The values are typically captured by one or more cameras, laser scanners and/or other imaging devices to capture the movements of the person's face. The capture may be two-dimensional or three dimensional.

While less expensive, two-dimensional motion capture using a single camera typically cannot provide sufficiently robust and/or detailed motion capture and is typically unable to fully capture three-dimensional motions, such as head rotation.

Three-dimensional motion capture typically employs multi-camera rigs or laser marker systems. Such systems may be expensive, complicated and time consuming to use.

Typical prior art facial motion capture system include so-called marker-based systems. Marker-based systems require the application of a number (e.g. up to 350 or more) markers to a person's face. High resolution cameras are then employed to track the markers. Such marker-based systems can be cumbersome, due to the time-consuming requirement of applying the markers to a person's face for each motion capture session.

While various markerless facial motion capture systems have been proposed, these systems typically only provide two-dimensional capture, require undesirable human assistance, cannot be used in real-time and/or need additional source information such as a projected pattern or invisible paint to be applied to the face.

There is a general desire to provide facial motion capture methods and system that are robust, accurate, can be used in real-time, and have a reduced reliance on the application of markers, projected patterns and invisible paint.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method for preparing a training data set for an artificial intelligence engine operable to convert markerless images of a target face into a mapping comprising a digital representation of the target face. The method comprises obtaining markered digital images of the target face of a first person, obtaining markerless digital images of one or more skin parts and obtaining markered digital images of the one or more skin parts. An intermediate artificial intelligence engine is trained to obtain a trained intermediate artificial intelligence engine operable to remove markers from markered digital images of skin. Training the intermediate artificial intelligence engine comprises providing the markered digital images of the one or more skin parts to the intermediate artificial intelligence engine as a source training data set and providing the markerless digital images of the one or more skin parts to the intermediate artificial intelligence engine as a target training data set. The trained intermediate artificial intelligence engine is employed to remove markers from each of the markered digital images of the target face of the first person to create, for each markered digital image, a corresponding synthetic markerless digital image of the target face of the first person. Each markered digital image of the target face of the first person is converted into a training mapping to create a corresponding training mapping for each synthetic markerless digital image. A training data set for the artificial intelligence engine is outputted. The training data set comprises the synthetic markerless digital images of the target face of the first person and the corresponding training mappings.

In some embodiments, employing the trained intermediate artificial intelligence engine to remove markers from the markered digital images of the target face of the first person to create corresponding markerless digital images of the target face of the first person comprises, cropping each of the markered digital images of the target face of the first person to create a plurality of tiles, employing the trained intermediate artificial intelligence engine to remove markers from each of the plurality of tiles and ensembling the plurality of tiles to create the corresponding markerless digital images of the target face of the first person. In some embodiments, each of the plurality of tiles overlaps at least one other tile of the plurality of tiles. In some embodiments, the method comprises ensembling the plurality of tiles by pixel-wise averaging to create the corresponding markerless digital images of the target face of the first person.

In some embodiments, the intermediate artificial intelligence engine comprises a cyclic generative adversarial network.

In some embodiments, the one or more skin parts comprise one or more skin parts of a second person. In some embodiments, the one or more skin parts comprise one or more skin parts of the first person.

In some embodiments, the method comprises obtaining markerless digital images of the one or more skin parts comprises obtaining a plurality of different cropped portions of at least one markerless digital image of the target face of the first person and obtaining markered digital images of the one or more skin parts comprises obtaining a plurality of different cropped portions of at least one of the markered digital images of the target face of the first person.

In some embodiments, training the intermediate artificial intelligence engine comprises providing, to the intermediate artificial intelligence engine, a correspondence between the markered digital images of the one or more skin parts and the markerless digital images of the one or more skin parts.

In some embodiments, training the intermediate artificial intelligence engine comprises employing the untrained intermediate artificial intelligence engine to generate synthetic markerless digital images of the one or more skin parts, each corresponding to one of the markered digital images of the one or more skin parts, assessing a quality of each of the synthetic markerless digital images of the one or more skin parts and updating the untrained intermediate artificial intelligence engine based at least in part on the assessment of the quality of each of the synthetic markerless digital images of the one or more skin parts.

In some embodiments, training the intermediate artificial intelligence engine comprises: (a) employing a generative network of the untrained intermediate artificial intelligence engine to create synthetic markerless digital images of the one or more skin parts, each corresponding to one of the markered digital images of the one or more skin parts; (b) employing a discriminative network of the untrained intermediate artificial intelligence engine to predict if each of the synthetic markerless digital images of the one or more skin parts is synthetic; (c) updating the untrained intermediate artificial intelligence engine based at least in part on each of the predictions of step (b); and (d) repeating steps (a) to (c) until an error metric of the discriminative network of the untrained intermediate artificial intelligence engine is greater than a target training threshold.

Another aspect of the invention provides a method for training an artificial intelligence engine operable to convert a markerless digital image of a target face into a mapping comprising a digital representation of the target face. The method comprises obtaining a training data set according to any of the methods described herein and training the artificial intelligence engine to obtain a trained artificial intelligence engine operable to convert a markerless digital image of the target face into a mapping comprising a digital representation of the target face. Training the artificial intelligence engine comprises providing the synthetic markerless digital images to the artificial intelligence engine as a source training data set, providing the corresponding training mappings to the artificial intelligence engine as a target training data set.

In some embodiments, training the artificial intelligence engine comprises providing, to the artificial intelligence engine, a correspondence between the synthetic markerless digital images and the corresponding training mappings.

In some embodiments, training the artificial intelligence engine comprises employing the untrained artificial intelligence engine to generate a plurality of synthetic mappings, each based on one of the synthetic markerless digital images of the target face, assessing a quality of each of the plurality of synthetic mappings and updating the untrained intermediate artificial intelligence engine based at least in part on the assessment of the quality of each of the plurality of synthetic mappings.

In some embodiments, training the artificial intelligence engine comprises: (a) employing a generative network of the untrained artificial intelligence engine to create a plurality of synthetic mappings, each based on one of the synthetic markerless digital images of the target face; (b) employing a discriminative network of the untrained artificial intelligence engine to predict if each of the plurality of synthetic mappings is synthetic; (c) updating the untrained intermediate artificial intelligence engine based at least in part on each of the predictions of step (b); and (c) repeating steps (a) to (c) until an error metric of discriminative network of the untrained artificial intelligence engine is greater than a target training threshold.

Another aspect of the invention provides a method of creating an animation based on a plurality of markerless target digital images of a target face. The method comprises employing an artificial intelligence engines described herein to convert the plurality of markerless target digital images of the target face into a plurality of corresponding target mappings, each comprising a digital representation of the target face and creating an animation wherein each frame of the animation is based at least in part on one of the plurality of corresponding target mappings.

In some embodiments, a facial expression depicted in each frame of the animation is based at least in part on the one of the plurality of corresponding target mappings.

In some embodiments, the plurality of corresponding target mappings each comprise a plurality of blendshape weights and wherein each frame of the animation is based at least in part on a weighted linear combination of a plurality of blendshapes, wherein the weights of the weighted linear combination are based at least in part on the blendshape weights of the one of the plurality of corresponding target mappings.

In some embodiments, the plurality of corresponding target mappings each comprise a plurality of face shape weights and wherein each frame of the animation is based at least in part on a weighted linear combination of a plurality of face shapes, wherein the weights of the weighted linear combination are based at least in part on the face shape weights of the one of the plurality of corresponding target mappings.

In some embodiments, the plurality of corresponding target mappings each comprise a plurality of Facial Action Coding System action units and wherein each frame of the animation is based at least in part on a combination of the Facial Action Coding System action units of the one of the plurality of corresponding target mappings.

In some embodiments, a facial expression depicted in each frame of the animation is based at least in part on the one of the plurality of corresponding target mappings.

In some embodiments, creating each frame of the animation comprises employing an animation rig to render a facial expression depicted in the frame of animation based at least in part on the one of the mappings.

Another aspect of the invention provides a system for preparing a training data set for an artificial intelligence engine operable to convert a markerless digital image of a target face into a mapping comprising a digital representation of the target face. The system comprises a processor configured (by suitable programming) to obtain markered digital images of the target face of a first person, obtain markerless digital images of one or more skin parts, obtain markered digital images of the one or more skin parts and train an intermediate artificial intelligence engine to obtain a trained intermediate artificial intelligence engine operable to remove markers from markered digital images of skin.

Training the intermediate artificial intelligence engine comprises providing the markered digital images of the one or more skin parts to the intermediate artificial intelligence engine as a source training data set and providing the markerless digital images of the one or more skin parts to the intermediate artificial intelligence engine as a target training data set. The processor configured (by suitable programming) to employ the trained intermediate artificial intelligence engine to remove markers from each of the markered digital images of the target face of the first person to create, for each markered digital image, a corresponding synthetic markerless digital image of the target face of the first person, convert each markered digital image of the target face of the first person into a training mapping to create a corresponding training mapping for each synthetic markerless digital image and output a training data set for the artificial intelligence engine, the training data set comprising the synthetic markerless digital images of the target face of the first person and the corresponding training mappings.

Another aspect of the invention provides system for training an artificial intelligence engine operable to convert a markerless digital image of a target face into a mapping comprising a digital representation of the target face. The system comprises a processor configured (by suitable programming) to employ any of the methods described herein to prepare a training data set and train the artificial intelligence engine to obtain a trained artificial intelligence engine operable to convert a markerless digital image of the target face into a mapping. Training the artificial intelligence engine comprises providing the synthetic markerless digital images to the artificial intelligence engine as a source training data set; and providing the corresponding training mappings to the artificial intelligence engine as a target training data set.

Another aspect of the invention comprises a system for creating an animation based on a plurality of markerless digital images of a target face. The system comprises a processor configured (by suitable programming) to employ an artificial intelligence engine described herein to convert the plurality of markerless digital images of the target face into a plurality of corresponding target mappings, each comprising a digital representation of the target face and create an animation wherein each frame of the animation is based at least in part on one of the plurality of corresponding target mappings.

Another aspect of the invention provides computer program product embodied on a non-transitory computer readable medium having stored thereon software instructions that, when executed by a processor, cause the processor to perform any of the methods of described herein.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
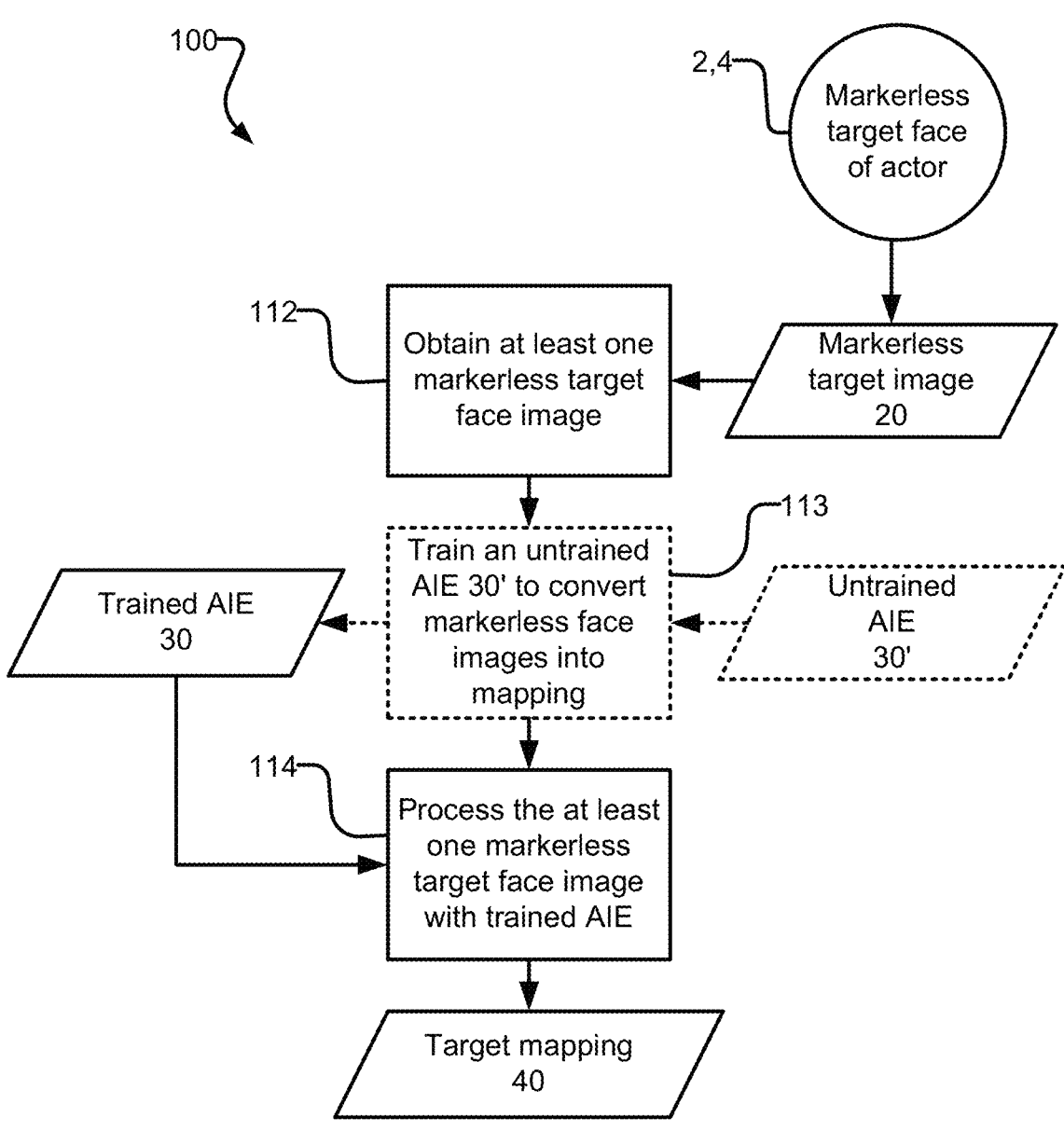
FIG. 1 depicts an exemplary method for obtaining a digital mapping from images of a markerless target face according to one embodiment of the invention.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

For convenience, digital images may be referred to herein as "images" and any reference to an "image" herein should be understood to be a reference to a digital image, unless indicated otherwise. Digital images may be in colour or may be monochromatic. In some embodiments, it is desirable to use monochromatic images for some method steps to reduce computing resource demands. Digital images discussed herein may be pre-processed or subject to post-processing. For example, digital images discussed herein may be filtered or processed to reduce noise and/or artefacts, such as those which may be introduced during the transmission and/or digitization process. Each image referred to herein may be captured with one or more digital cameras or other imaging devices. In some embodiments, images of faces are captured with a head-mounted camera system. In some embodiments, images are captured with machine vision cameras.

Images discussed herein may refer to still images in a form of encoded digital data and/or moving visual images (e.g. video) in a form of encoded digital data. Such moving visual images may comprise a series of still images of encoded digital data (frames) for display in rapid succession. Images may be recorded, stored, transferred, converted, etc. in various formats. For example, images discussed herein may be in a native format, a raw format, a compressed format, an uncompressed format, a JPEG file format, a GIF file format, an MPEG file format, a TIF file format, a PNG file format, AVI file format, or any other suitable digital image format.

One aspect of the invention provides a facial motion capture method for obtaining a digital mapping (also referred to simply as a "mapping") from markerless images of a face.

A digital mapping may comprise any suitable digital representation of a target face. In some embodiments, a digital mapping may comprise values (e.g. spatial locations or offsets (relative locations)) for each of a plurality of reference points of a target face. The values for each reference point may be used to form a digital mesh or mask representing the target face. The reference points may correspond to landmarks on the face, such as a nose, mole, eyelid, etc. This is not mandatory. In some embodiments, the reference points are chosen independently of any specific features of the face. In some embodiments, a high-resolution digital mapping may provide values for each of more than 10,000 reference points on a face, more than 50,000 reference points on a face or more than 60,000 reference points on a face.

In some embodiments, the mapping comprises a plurality of weights employable to create a weighted combination of a plurality of blendshapes such as face shapes. For example, in some embodiments, a plurality of face scans of the target's face are obtained (e.g. more than 1,000, 5,000 or 10,000 face scans). Each face scan may represent a different expression of the target's face. The plurality of face scans may together represent a broad range of different facial expressions of the target actor. Using, for example, principal component analysis, the plurality of face scans may be reduced to a plurality of face shapes. The number of face shapes may be significantly smaller than the number of face scans. For example, there may be five, 10 or 100 times fewer face shapes than face scans.

Each of the facial expressions of the plurality of face scans may be represented by a weighted combination of the face shapes. For example, by providing a weight for each face shape, it is possible to create a mapping of each facial expression represented in the plurality of face scans. This can be achieved for each reference point by summing each weight multiplied by the reference point value of its corresponding face shape. In one exemplary, embodiment, 10,000 face scans, each having 60,000 reference points are represented by 160 unique face shapes. In this case, a mapping of each of the 60,000 reference points of a single one of the plurality of face scans may be represented by 160 weights (e.g. a weight for each face shape).

In some embodiments, the mapping comprises a plurality of Facial Action Coding System action units where each action unit comprises a component (e.g. a muscle movement) of a facial expression.

In some embodiments, the facial motion capture method employs a first artificial intelligence engine ("AIE") to convert markerless images of a face into a mapping. In some embodiments, the first AIE is trained with data prepared by a second AIE. In some embodiments, images of a specific actor are employed to train the first and second AIEs. The resultant first AIE may be specialized for the specific actor. While such a first AIE may still create mappings from markerless images of other actors, it is expected that the first AIE will provide more accurate mappings for markerless images of the specific actor. In some embodiments, images of multiple actors are employed to train one or both of the first and second AIEs. The resultant first AIE may not be specialized for any specific actor. In this way, the resultant first AIE may be better able to create mappings from markerless images of actors that were not used in training.

FIG. 1 depicts an exemplary, non-limiting method 100 for markerless facial motion capture according to a particular embodiment.

Method 100 starts at step 112, which comprises obtaining one or more markerless target images 20. Markerless target images 20 may comprise one or more images of a markerless target face 4 of a target actor 2. Each markerless target image 20 may show a different expression of target actor 2. Together, a plurality of markerless target images 20 may be representative of movement of one or more features of target face 4. Markerless target face 4 is free of tracking markers typically employed for marker-based facial motion capture. Markerless target face 4 may be natural (e.g. without makeup) or with makeup. Method 100 is not dependent on the application of such makeup.

In some embodiments, step 112 comprises capturing markerless target images 20 (e.g. with a digital camera). In some embodiments, step 112 comprises receiving or transferring markerless target images 20 that were previously captured.

Step 114 of method 100 comprises processing markerless target images 20 with a trained AIE 30 to obtain a target mapping 40 of target face 4 of actor 2 based at least in part on markerless target images 20. Target mapping 40 may comprise independent representations of target face 4 for each markerless target image 20.

AIE 30 may comprise any suitable artificial intelligence engine capable of providing the functionality described herein and/or may be trained using any of the methods or training data described herein. In some embodiments, method 100 comprises an optional step 113 of training an untrained AIE 30' before step 114. Alternatively, in some embodiments, AIE 30 is trained prior to, or otherwise separately from, method 100. In some embodiments, AIE 30 is trained according to method 200 described further herein.

Target mapping 40 may be employed, e.g. using a suitably programmed computer, to produce, for example, computer animation of characters for videos, movies, video games and the like. Target mapping 40 may be employed for security purposes.

For example, in some embodiments, target mapping 40 is provided to an animation rig (e.g. a facial animation rig) to create at least a part of an animation (e.g. animated frames) by causing the rig to simulate the facial expressions depicted in markerless target images 20 wherein at least a portion of each frame of the animation corresponds to one of markerless target images 20. The animation rig may be any suitable animation rig. The animation rig may be created by one or more artists. In some embodiments, the animation rig has a similar likeness to target face 4 of actor 2 but this is not mandatory. In other embodiments, target mapping 40 is provided to animate an animation rig with a likeness (which may be human, non-human, animal, fictitious, humanoid, etc.) that is dissimilar to target face 4 of actor 2. Despite the likeness of the animation rig being different from target face 4, the simulated facial expressions of the animation rig are still based on markerless target images 20 from which mapping 40 is derived, as set out herein. As such, by obtaining markerless target images 20 of an actor 2 and employing methods described herein, the facial expressions of that actor may effectively be transferred to a simulated or animated character to be used as part of, for example, an animated video sequence (e.g. an animated movie), video game, etc. By transferring such facial expressions from an actor (as opposed to an artist creating such facial expressions), the resulting animation may appear to have a more actor-like quality, whether the character is human or not. Moreover, as this method may receive markerless target images 20 (as opposed to markered target images), applying markers or markings to actor 2 may be avoided at least in part.

In some embodiments, target mapping 40 comprises a plurality of blendshape weights (e.g. face shape weights) for each markerless target image 20, wherein the blendshape weights correspond to a plurality of blendshapes (e.g. face shapes). A weighted linear combination of the plurality of blendshapes based (weighted at least in part, by the blendshape weights from mapping 40 for a single markerless target image 20) may be employed to create at least a portion of a corresponding single frame of animation by causing an animation rig to simulate a facial expression depicted in the single markerless target image 20. At least a portion of multiple frames of animation may therefore be created by repeating the same steps with blendshape weights of target mappings 40 for additional markerless target images 20. Accordingly, a performance of a target actor 2 (specifically the face 4 of target actor 2) may be used (without markers) to create a series of blendshape weights (target mapping 40), with one set of blendshape weights (target mapping 40) for each frame of markerless target images 20. This series of blendshape weights (target mapping 40) may in turn be used to transfer the performance of actor 2 to an animation rig which may use the series of blendshape weights (target mapping 40), to thereby an animate a computer-generated (CG) character.

Another aspect of the invention provides methods for training an AIE (e.g. training AIE 30 used in method 100) to convert markerless images of a face (e.g. markerless target face image(s) 20 used in method 100) into a mapping (e.g. target mapping 40 of method 100). This AIE training method may be performed in optional block 113 of method 100.

Figure 2:
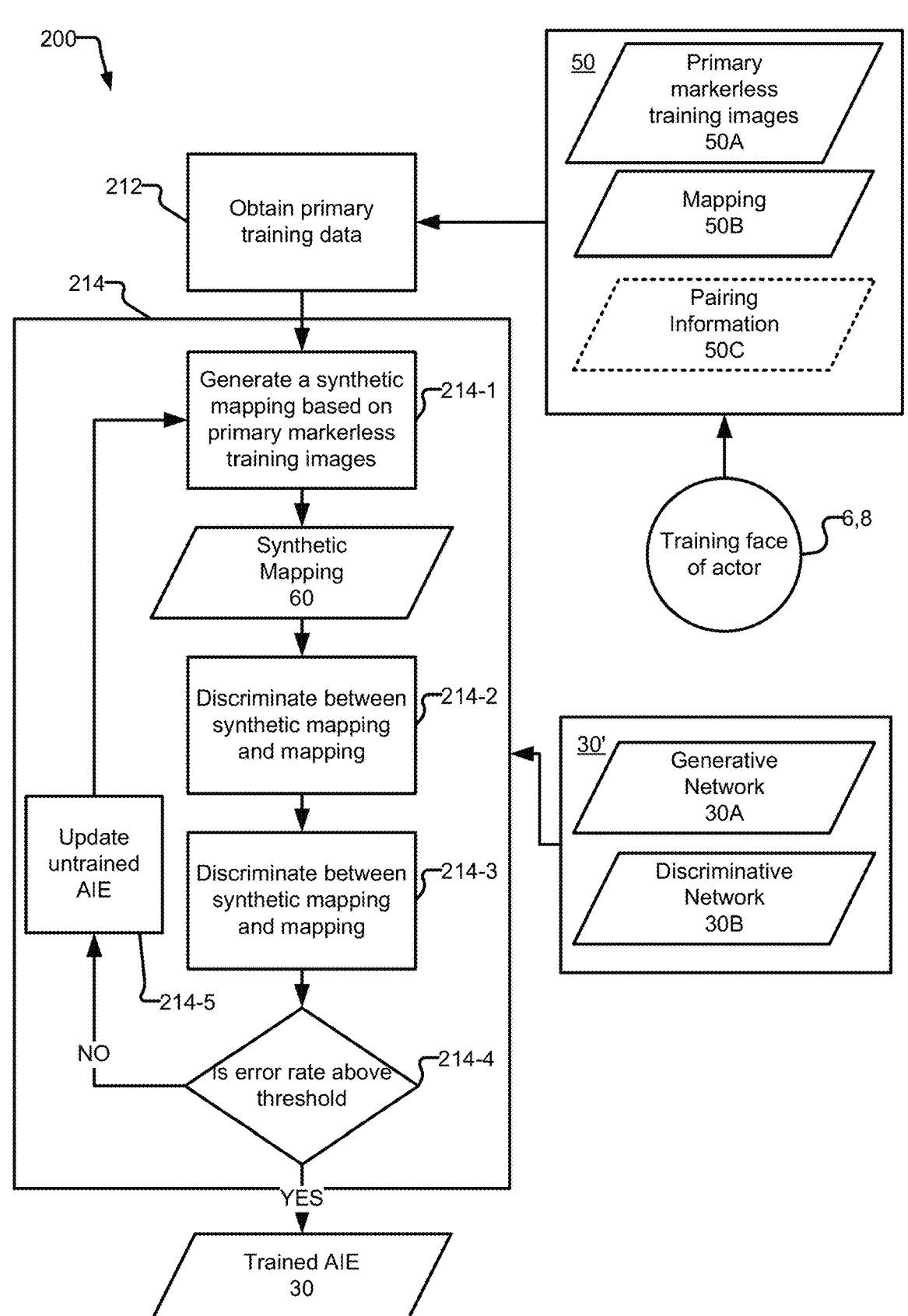
FIG. 2 depicts an exemplary method for training an artificial intelligence engine to create a digital mapping from images of a markerless target face according to one embodiment of the invention.

FIG. 2 depicts an exemplary, non-limiting method 200 for training an untrained AIE 30' to convert markerless target images 20 into target mapping 40 according to a particular embodiment. In some embodiments, method 200 may be employed at optional step 113 of method 100, although this is not mandatory and method 200 may be practiced independently of method 100 and/or method 300 (discussed further herein).

Method 200 of the illustrated embodiment begins at step 212, which comprises obtaining primary training data 50. Primary training data 50 may be prepared according to any suitable method. In some embodiments, step 212 comprises preparing primary training data 50 according to a method 300 described further herein.

Primary training data 50 may comprise primary markerless training images 50A of one or more markerless training faces 8 and corresponding primary training mappings 50B of each training face 8. In some embodiments, primary training data 50 comprises primary training pairing data 50C for relating each primary markerless training image 50A to a corresponding primary training mapping 50B. Primary training pairing data 50C may allow for supervised training of untrained AIE 30'. Primary training pairing data 50C is not mandatory in some embodiments, where "unsupervised" training of untrained AIE 30' may be used.

Each training face 8 corresponds to an individual training actor 6. In some embodiments, method 200 employs multiple training images 50A (each representing a different facial expression) of a single training actor 6 (e.g. a single training face 8). For example, in some embodiments, only target actor 2 (see method 100 of FIG. 1) is used as training actor 6 for method 200. An AIE 30 trained with primary training data 50 of only target actor 2,6 may be specialized for target actor 2,6 and produce more accurate mappings 40 of target actor 2 when employed in method 100.

In some embodiments, method 200 employs multiple training images 50A (each representing a different facial expression) of multiple training actors 6 (which may or may not include target actor 2). Where a plurality of different training actors 6 are employed for method 200, the resultant trained AIE 30 may better accommodate different target actors 2 without being specifically trained for each individual target actor 2. As the number of different training actors 6 employed for method 200 increases, the effectiveness of employing AIE 30 in method 100 may increase for target actors 2 that were not used as training actors 6 for method 200. For example, an AIE 30 trained with a sufficient number of different training actors 6 may be employed to create target mappings 40 for almost any target actor 2 without training AIE 30 specifically for such a target actor 2.

Step 214 of method 200 comprises training an untrained AIE 30' using primary training data 50 to thereby generate trained AIE 30.

Untrained AIE 30' (and the resultant trained AIE 30) may comprise any suitable artificial intelligence engine capable of performing the functionality described herein. Untrained AIE 30' (and the resultant trained AIE 30) may comprise a machine learning model. In some embodiments, AIE 30' (and the resultant trained AIE 30) comprise a transformer with an attention mechanism. In some embodiments, AIE 30' (and the resultant trained AIE 30) comprise a variational autoencoder. In some embodiments, AIE 30' (and the resultant trained AIE 30) comprise a neural network such as, but not limited to, a feed forward neural network. In some embodiments, AIE 30' (and the resultant trained AIE 30) comprise a multilayer perceptron neural network. In some embodiments, AIE 30', 30 comprises a generative artificial intelligence engine, such as, but not limited to, a generative adversarial network. In some embodiments, AIE 30', 30 comprises a cyclic generative adversarial network.

In some embodiments, untrained AIE 30' (and the resultant trained AIE 30) comprise a generative network 30A and a discriminative network 30B. In some embodiments, generative network 30A comprises a convolutional neural network. In some embodiments, discriminative network 30B comprises a convolutional neural network. In some embodiments, generative network 30A and/or discriminative network 30B are deep neural networks.

As shown in FIG. 2, step 214 may comprise a plurality of substeps.

Substep 214-1 comprises generating synthetic mapping(s) 60 based on primary markerless training images 50A. Synthetic mapping(s) 60 may be generated using untrained AIE 30' (in the first iteration of substep 214-1) or using partially trained AIE 30' (in subsequent iterations of substep 214-1).

At substep 214-2, discriminative network 30B discriminates between the substep 214-1 synthetic mappings 60 and corresponding (e.g. for the same primary markerless training image 50A) primary training mappings 50B. Optionally, primary training pairing data may be used to correlate synthetic mappings 60 and corresponding primary training mappings 50B.

In some embodiments, generative network 30A and discriminative network 30B are arranged in a cyclic generative adversarial network that is configured to increase an error metric (e.g. an error rate) of discriminative network 30B until the error rate hits a threshold or target value (which may be user-defined). For example, in the illustrated embodiment, at substep 214-3, the error rate of discriminative network 30B is determined and, in substep 214-4, this error rate is compared to the threshold value. If the error rate is above the threshold value, method 200 continues from substep 214-4 to output a trained AIE 30. On the other hand, if the error rate is below the target value, method 200 returns to substep 214-1 via substep 214-5. Substep 214-5 involves updating untrained AIE 30' (e.g. generative network 30A and/or discriminative network 30B) before looping back to substep 214-1 to generate another synthetic mapping 60. Substep 214-5 may comprise updating the coefficients of generative network 30A and/or discriminative network 30B to increase the error rate of discriminative network 30B. The substep 214-5 update of AIE 30' may involve changing the coefficients of a generative network 30A and/or discriminative network 30B in accordance with a gradient that minimizes an objective function. In this sense, after the first iteration of substep 214-5 and prior to exiting the substep 214-4 inquiry via the YES branch, AIE 30' may be considered to be a partially trained AIE 30'.

Method 200 outputs a trained AIE 30 capable of receiving markerless target images of target face 4 and outputting a target mapping 40 that accurately corresponds to target face 4 (see method 100 of FIG. 1).

Using prior art techniques, obtaining a sufficient volume of primary training data 50 would not be practical. For example, using prior art techniques, it would first be necessary to employ a traditional markered facial motion capture technique to obtain a digital mapping. Then, to obtain markerless images of training target face 8 (described in more detail below) that correspond to the digital mapping, it would be necessary to manually alter each image to remove the markers. Given that primary markerless training images 50A may comprise 60 seconds or more of high frame rate video for each training face 8 (e.g. thousands or even tens of thousands of individual image frames), manual marker removal is not economical in practice. Alternatively, one could attempt to separately capture markerless images that correspond exactly (in angle, lighting, etc.) to the captured markered images used for the conventional techniques. However, such a method is undesirable as it would be practically impossible to obtain markered and markerless images with the same lighting, angle, and other characteristics, as would be desirable for producing effective primary training data 50. Therefore, such separately captured (markered and markerless) images would result in a poorly trained model.

Aspects of the invention provide methods for preparing effective primary training data 50 without requiring impractical amounts of manual labour and while maintaining precise correspondence between primary markerless training images 50A and primary training mapping(s) 50B. Such methods for preparing primary training data 50 may result in an AIE 30 that is inexpensive, requires low amounts of training time, and is robust and accurate. Such methods for preparing primary training data 50 may be used, for example, at block 212 of method 200 (FIG. 2) to train AIE 30. The trained AIE 30 may then be used to generate target mapping 40 using markerless target face images 20 (e.g. at block 114 of method 100 (FIG. 1)).

Figure 3:
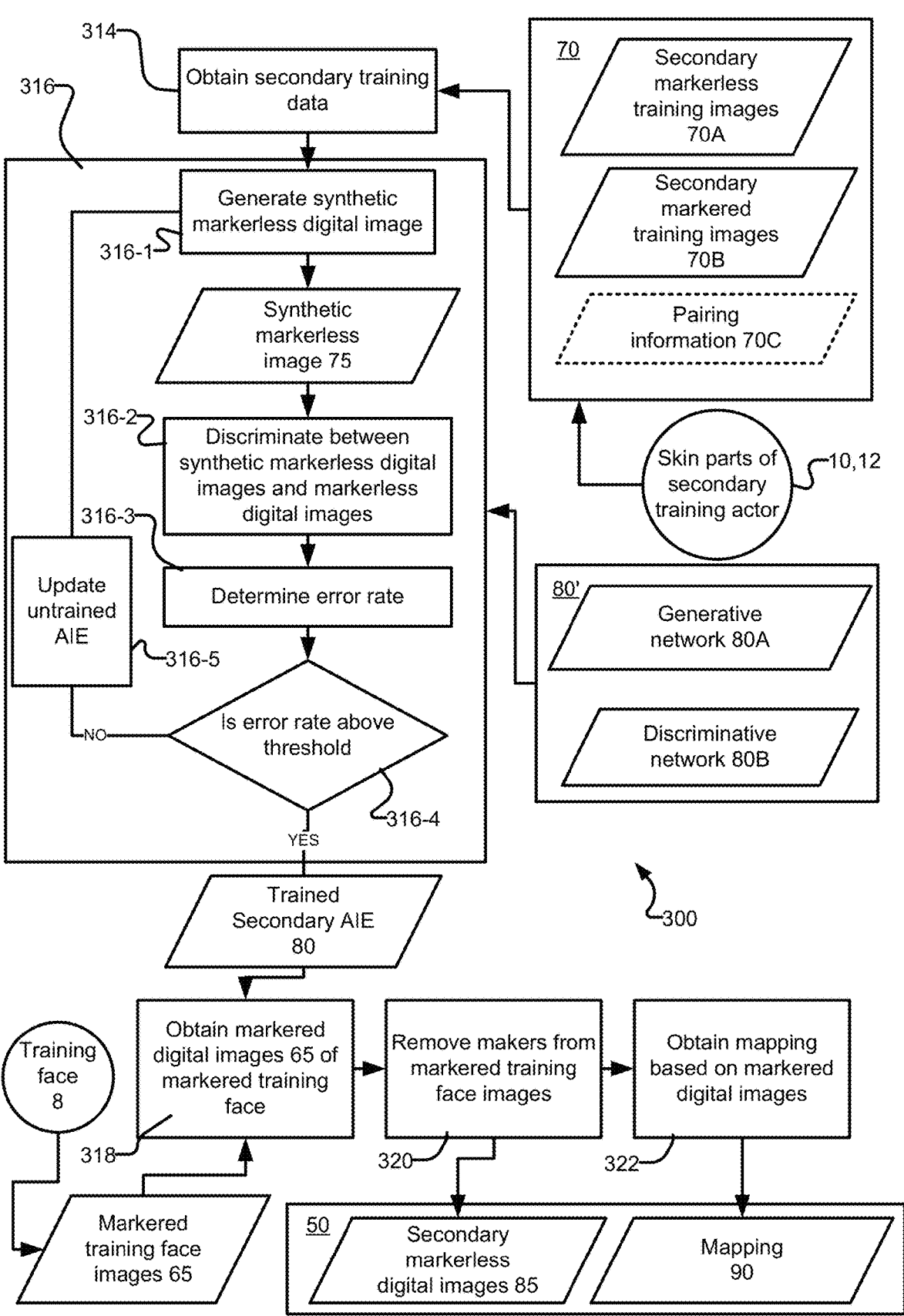
FIG. 3 depicts an exemplary method for obtaining training data for training an artificial intelligence engine to create a digital mapping from images of a markerless target face according to one embodiment of the invention.

FIG. 3 depicts an exemplary, non-limiting, method 300 for preparing primary training data 50 for training untrained AIE 30' according to a particular embodiment. In some embodiments, method 300 may be employed at step 212 of method 200, although this is not mandatory and method 300 may be practiced independently of method 100 and/or method 200.

Method 300 begins at step 314 which comprises obtaining secondary training data Secondary training data 70 may comprise secondary markerless training images 70A of markerless skin parts 10 and secondary markered training images 70B of markered skin parts 10. In some embodiments, secondary data 70 comprises secondary training pairing data 70C relating individual secondary markerless training images 70A to corresponding individual secondary markered training images 70B. Secondary training pairing data 70C is not mandatory.

Figure 4B:
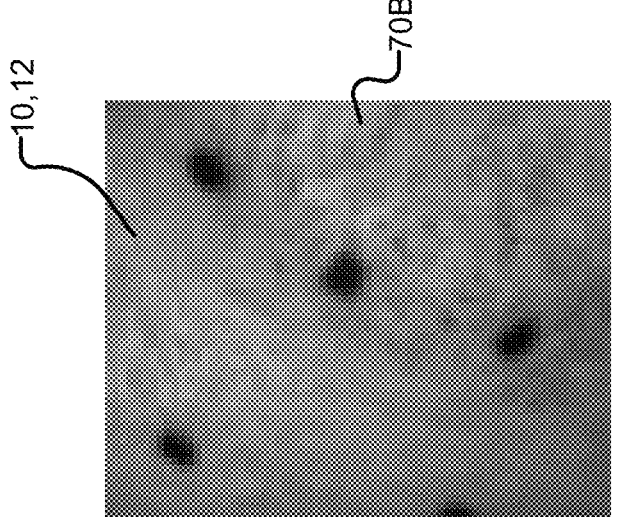
FIG. 4B depicts an exemplary image of markered skin.
Figure 4A:
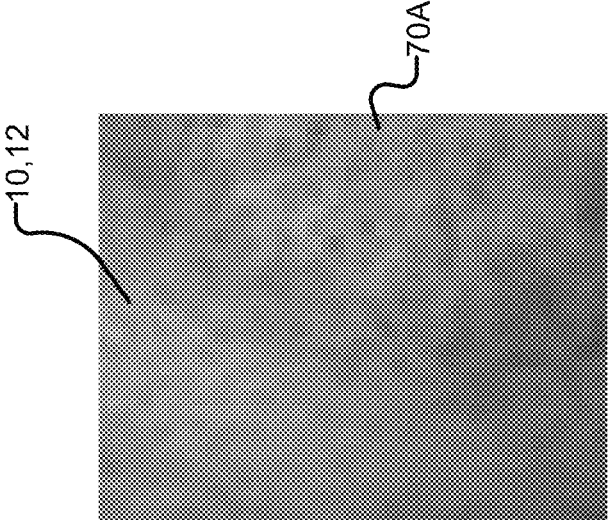
FIG. 4A depicts an exemplary image of markerless skin.

Secondary markerless training images 70A may comprise images of one or more markerless skin parts 10 of one or more secondary training actors 12. Markerless skin parts are free of tracking markers (e.g. the type typically employed for marker-based facial motion capture). Each markerless skin part 10 may be natural (e.g. without makeup) or with makeup. Method 300 is not dependent on the application of such makeup. An example of a portion of a secondary markerless training image 70A of a skin part 10 is shown in FIG. 4A.

Secondary markered training images 70B may comprise images of one or more markered skin parts 10 of one or more secondary training actors 12. Markered skin parts 10 each have one or more markers (e.g. of the type typically employed for marker-based facial motion capture) applied thereto. Each markered skin part 10 may otherwise be natural (e.g. without makeup) or with makeup. Method 300 is not dependent on the application of such makeup. An example of a portion of a secondary markered training image 70B of a markered skin part 10 is shown in FIG. 4B.

Skin parts 10 may each come from any part of the human body of a secondary training actor 12. For example, skin parts 10 may each comprise a portion of skin from an arm, a leg, a torso, a face, etc. In some embodiments, corresponding secondary markered and markerless images 70A, 70B comprise images of the same portion of skin with and without markers. For example, such corresponding secondary markered and markerless images 70A, 70B may each depict the same portion of an arm, a leg, a torso, a face, etc. In some embodiments, such corresponding secondary markered and markerless images 70A, are captured with similar conditions (e.g. lighting, angle, makeup etc.). This is not mandatory, in some embodiments, there is no correspondence (e.g. in body part or in actor) between secondary markered and markerless images 70A, 70B). In some embodiments, secondary markerless images 70B are created by one or more artists by removing the markers from secondary markered images 70A. In some embodiments, it may improve the quality of secondary AIE 80 if secondary markered and markerless images 70A, 70B comprise corresponding images of the same portion of skin with and without markers.

In some embodiments, secondary markered and markerless images 70A, 70B depict one or more skin parts 10 from a single secondary training actor 12. In some embodiments, only target actor 2 (see method 100 of FIG. 1) is used as a secondary training actor 12 for step 314. In such cases, a secondary AIE 80 trained with secondary training data 70 of only target actor 2 may be specialized for target actor 2 and produce more accurate results when target actor 2 is subject of the images processed at step 320 of method 300 (described further below). In other embodiments, multiple different secondary training actors 12 (which may or may not include target actor 2 and/or training actor(s) 8) are used at step 314. Where a plurality of different secondary training actors 12 are employed at step 314, secondary AIE 80 may better accommodate images of different actors at step 320 of method 300 (described further below). As the number of different secondary training actors 12 increases, the effectiveness of employing secondary AIE 80 at step 320 of method 300 may increase for actors that were not used as secondary training actors 12 during step 314.

In some embodiments, step 314 comprises capturing secondary markerless training images 70A of skin and/or secondary markered training images 70B of skin (e.g. with a digital camera). In some embodiments, step 314 comprises receiving or transferring secondary markerless training images 70A of skin and/or secondary markered training images 70B of skin that were previously captured.

In some embodiments, step 314 comprises cropping (e.g. using only a smaller portion of a captured image) one or more images of markerless skin to obtain secondary markerless training images 70A and/or cropping one or more images of markered skin to obtain secondary markered training images 70B. By cropping captured images to obtain secondary markerless training images 70A and secondary markered training images 70B, the total number of secondary markerless training images 70A and secondary markered training images 70B obtained from each captured image may be increased by multiple times (e.g. by more than 10 times, 100 times or even 1000 times). Further, by employing smaller (e.g. cropped) secondary markered and markerless images 70A, 70B to train secondary AIE 80 at step 320 (described further below), secondary AIE 80 may be trained faster and/or with reduced computing resources.

In some embodiments, secondary markered training images 70B are obtained by cropping markered training face images 65 (discussed further herein). For example, in the case that training markered training face images 65 are of a resolution of greater than 256×256 pixels (e.g. 2048×1536) pixels, markered training face images 65 can be cropped into a plurality of images of 256×256 pixels which may be employed as secondary markered training images 70B. Markered training face images 65 may be cropped randomly or according to a pattern. The croppings may overlap or may be spaced apart.

The total number of secondary markerless training images 70A and secondary markered training images 70B may be increased by rotating captured images or otherwise altering captured images.

Once secondary training data 70 is obtained at block 314, method 300 proceeds to step 316, which involves providing secondary training data 70 to a secondary untrained AIE to train secondary untrained AIE 80' and thereby obtain trained secondary AIE 80.

Untrained secondary AIE 80' (and the resultant trained secondary AIE 80) may comprise any suitable untrained artificial intelligence engine. Untrained secondary AIE 80' (and the resultant trained secondary AIE 80) may comprise a machine learning model. In some embodiments, secondary AIE 80' (and the resultant trained secondary AIE 80) comprise a transformer with an attention mechanism. In some embodiments, secondary AIE (and the resultant trained secondary AIE 80) comprise a variational autoencoder. Secondary AIE 80' (and the resultant trained secondary AIE 80) may comprise a generative artificial intelligence engine, such as, but not limited to, a generative adversarial network. In some embodiments, secondary AIE 80' (and the resultant trained secondary AIE 80) comprise a cyclic generative adversarial network.

In some embodiments, secondary untrained AIE 80' (and the resultant trained secondary AIE 80) comprise a secondary generative network 80A and a secondary discriminative network 80B. In some embodiments, secondary generative network 80A comprises a convolutional neural network. In some embodiments, secondary discriminative network 80B comprises a convolutional neural network. In some embodiments, secondary generative network 80A and secondary discriminative network 80B are deep neural networks.

As shown in FIG. 3, step 316 may comprise a plurality of substeps.

At substep 316-1, secondary generative network 80A is configured to generate synthetic markerless images 75 corresponding to each of the secondary markered training images 70B. For example, at substep 316-1, secondary generative network 80A may generate a first synthetic markerless image 75 corresponding to a first secondary markered training image 70B.

At substep 316-2, secondary discriminative network 80B discriminates between synthetic markerless image 75 generated at substep 316-1 and secondary markerless training images 70A. Specifically, where secondary training pairing data 70C is provided at step 316, secondary discriminative network 80B discriminates between each synthetic markerless image 75 and the corresponding secondary markerless training images 70A. For example, at substep 316-2, secondary discriminative network 80B may discriminate between the first synthetic markerless image 75 and a first secondary markerless training image 70A where the first secondary markerless training image 70A is a pair of (corresponds to) the first secondary markered training image 70B employed at substep 316-1 (e.g. the first secondary markerless training image 70A and the first secondary markered training image 70B depict the same skin part 10, in the same lighting conditions and from the same angle).

Where secondary training pairing data 70C is not available/provided (e.g. where there is no correspondence between secondary markered and markerless images 70A, 70B), step 316-2 may comprise "unsupervised" training of untrained secondary AIE 80'.

In some embodiments, secondary generative network 80A and secondary discriminative network 80B are arranged in a cyclic generative adversarial network that is configured to increase an error metric (e.g. an error rate) of secondary discriminative network 80B until the error rate is greater than a suitable threshold or target value (which may be user-defined).

For example, in the illustrated embodiment of FIG. 3, substep 316-3 comprises determining the error rate of secondary discriminative network 80B and substep 316-4 involves comparing this error rate to a threshold value. If the error rate is greater than the threshold value, method 300 continues from substep 316-4 to output a trained secondary AIE 80. On the other hand, if the error rate is equal to or less than the threshold value, method 300 returns to substep 316-1 via substep 316-5. Substep 316-5 involves updating secondary untrained AIE 80' (e.g. generative network 80A and/or discriminative network before looping back to substep 316-1 to generate another synthetic markerless digital image 75. The substep 316-5 update of secondary AIE 80' may comprise updating the coefficients of generative network 80A and/or discriminative network 80B to increase the error rate of discriminative network 80B. The substep 316-5 update of secondary AIE 80' may involve changing the coefficients of a generative network 30A and/or discriminative network 30B in accordance with a gradient that minimizes an objective function. In this sense, after the first iteration of substep 316-5 and prior to exiting the substep 316-4 inquiry via the YES branch, secondary AIE 80' may be considered to be a partially trained secondary AIE 80'.

Step 316 of method 300 outputs a trained secondary AIE 80 capable of receiving markered images of skin and outputting corresponding markerless images of skin therefrom. For example, in some embodiments, secondary AIE 80 may be employed to generate synthetic markerless images of a face from markered images of the same face.

Step 318 comprises obtaining markered training face images 65 of training face(s) 8 where each training face 8 has one or more markers (e.g. of the type typically employed for marker-based facial motion capture) applied thereto. Each training face 8 may otherwise be natural (e.g. without makeup) or with makeup. Method 300 is not dependent on the application of such makeup.

In some embodiments, step 318 comprises capturing markered training face images (e.g. with a digital camera).

In some embodiments, step 312 comprises receiving or transferring markered training face images 65 that were previously captured.

Figure 5B:
FIG. 5B depicts an exemplary synthetic image of a markerless face generated based on the image of FIG. 5A.
Figure 5A:
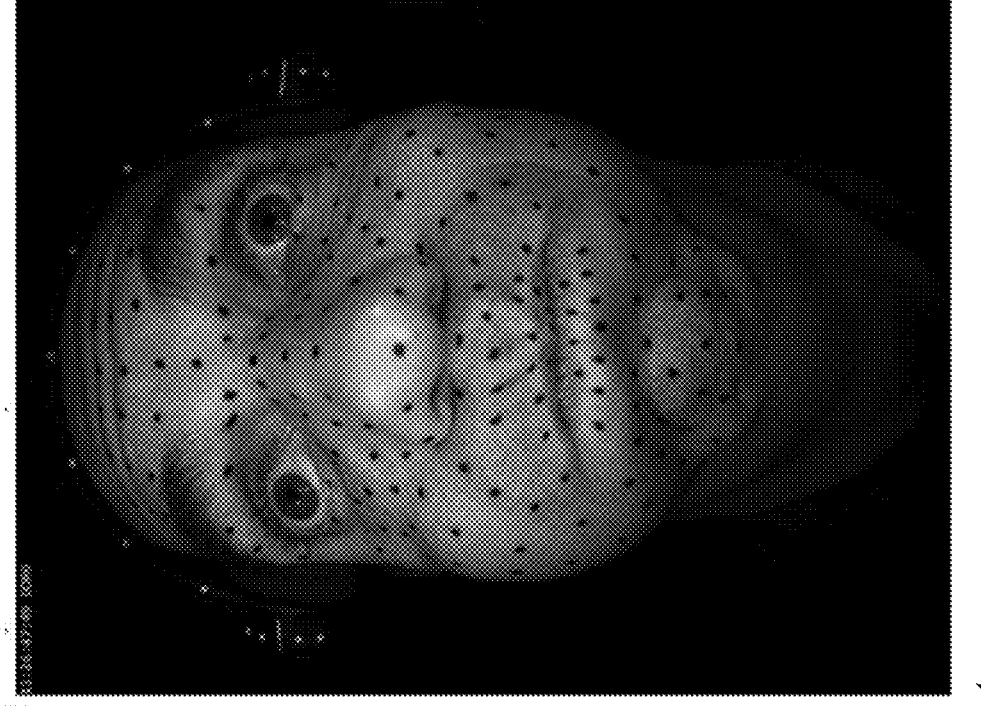
FIG. 5A depicts an exemplary image of a markered face.

Method 300 then proceeds to step 320, where trained secondary AIE 80 is employed to remove the markers from markered training face images 65 (obtained at block 318) to obtain corresponding synthetic markerless images 85 of training face(s) 8. Since synthetic markerless images 85 of training face(s) 8 are based on training face images 65 of training face(s) 8, synthetic markerless images 85 will appear as if captured with the same camera, from the same angle and with the same lighting as markered training face images 65, as can be seen by comparing an exemplary markered training face image 65 shown in FIG. 5A and a corresponding synthetic markerless image 85 in FIG. 5B. Synthetic markerless images 85 may therefore be employed, for example, as primary markerless training images for training untrained AIE 30' at step 214 of method 200.

In some embodiments, step 320 comprises rescaling and/or dividing markered training face images 65 before employing secondary AIE 80. Rescaling and/or dividing markered training face images 65 may reduce the computational burden of secondary AIE and/or may increase the speed of step 320.

In some embodiments, each markered training face image 65 is divided into a plurality of training face image tiles before employing secondary AIE 80. Secondary AIE 80 may then process each training face image tile independently. In some embodiments, secondary AIE 80 may process pluralities of training face image tiles of a markered training face image 65 in parallel.

In some embodiments, training face image tiles do not overlap one another. In some embodiments, training face image tiles overlap one another. For example, in some embodiments, each training face image tile overlaps over 90% of an adjacent training face image tile. In some embodiments, at least two training face image tiles overlap each pixel of a markered training face image 65. Notably, although secondary AIE 80 may be trained with a first size of image (e.g. 256×256 pixels), secondary AIE 80 may still process images or image tiles of a greater size (e.g. 1020× 724 pixels).

In an exemplary embodiment, a markered training face image 65 comprises 2048×1536 pixels. The markered training face image 65 may first be rescaled to 1024×728 pixels. The markered training face image 65 may then be divided into 16 overlapping training face image tiles of 1020×724 pixels. The overlapping training face image tiles may be arranged, for example, as follows. Assuming that a coordinate [0,0] represents the upper left corner of the image, then the upper left corner of each tile is at the coordinate [floor(n/4), mod(n, 4)] where n is an integer from 1 to 16 representing the tile number.

After each training face image tile is processed, the transformed tiles may be ensembled. In some embodiments, the transformed tiles are ensembled using a pixel-wise averaging. The transformed tiles may be ensembled by a min function, a max function, a median function, a combination thereof or any other suitable ensembling function. If markered training face image 65 was rescaled prior to transformation by secondary AIE 80, the ensemble results may be rescaled as desired to produce synthetic markerless images 85. Using a pixel-wise average of the transformed overlapping tiles (as opposed to processing an entire markered training face image 65 at once) may produce synthetic markerless images 85 which are more temporally stable (e.g. less flickering and noise when viewing as a sequence of images) since the output value of any given pixel is a consensus (average) of multiple independent invocations of secondary AIE 80.

In some embodiments, pixel-wise averaging comprises, for each pixel of a markered training face image 65, summing the value at that pixel of each training face image tile that overlaps with that pixel and dividing the sum by the number of tiles that overlap with that pixel. For example, if two tiles overlap with the pixel at coordinate [0, 4], the first tile has a value of x at pixel [0, 4] and the second tile has a value of y at pixel [0, 4] then pixel [0, 4] of the corresponding synthetic markerless image 85 has pixel-wise average of $(x+y)/2$.

Method 300 of the FIG. 3 embodiment, then proceeds to step 322, where a training mapping 90 may be obtained based on markered training face images 65 of training faces 8. In some embodiments, training mapping 90 is obtained from markered training face images 65 using conventional marker-based facial motion capture processing techniques such as, for example, those provided by OptiTrack™, Vicon Carapost™, etc. Training mapping 90 may then be employed, for example, as primary training mapping 50B for training untrained AIE 30' at step 114 of method 100. Consequently, training mapping 90 should be of the mapping format as is desired for the operation of AIE 30 (see FIG. 1).

Primary markerless training images 50A (e.g. synthetic markerless images 85 obtained at step 320 of method 300) and primary training mapping 50B (e.g. training mapping 90 obtained at step 322 of method 300) may be outputted from method 300 as primary training data 50. Primary training data 50 may be employed, for example, in method 200 described herein.

Where a component is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Unless the context clearly requires otherwise, throughout the description and any accompanying claims (where present), the words "comprise," "comprising," and the like are to be construed in an inclusive sense, that is, in the sense of "including, but not limited to." As used herein, the terms "connected," "coupled," or any variant thereof, means any connection or coupling, either direct or indirect, between two or more elements; the coupling or connection between the elements can be physical, logical, or a combination thereof. Additionally, the words "herein," "above," "below," and words of similar import, shall refer to this document as a whole and not to any particular portions. Where the context permits, words using the singular or plural number may also include the plural or singular number respectively. The word "or," in reference to a list of two or more items, covers all of the following interpretations of the word: any of the items in the list, all of the items in the list, and any combination of the items in the list.

Embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method and/or to provide the functionality as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods and/or provide functionality as described herein by executing software instructions in a program memory accessible to the processors.

Software and other modules may reside on servers, workstations, personal computers, tablet computers, image data encoders, image data decoders, PDAs, media players, PIDs and other devices suitable for the purposes described herein. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, network PCs, mini-computers, mainframe computers, and the like.

While processes or blocks of some methods are presented herein in a given order, alternative examples may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed in parallel, or may be performed at different times. In addition, while elements are at times shown as being performed sequentially, they may instead be performed simultaneously or in different sequences. It is therefore intended that the following claims are interpreted to include all such variations as are within their intended scope.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

This invention has a number of non-limiting aspects. Non-limiting aspect of the invention include:

1. A method for preparing a training data set for an artificial intelligence engine operable to convert markerless images of a target face into a mapping comprising a digital representation of the target face, the method comprising;

obtaining markered digital images of the target face of a first person;

obtaining markerless digital images of one or more skin parts;

obtaining markered digital images of the one or more skin parts;

training an intermediate artificial intelligence engine to obtain a trained intermediate artificial intelligence engine operable to remove markers from markered digital images of skin, wherein training the intermediate artificial intelligence engine comprises:

providing the markered digital images of the one or more skin parts to the intermediate artificial intelligence engine as a source training data set; and providing the markerless digital images of the one or more skin parts to the intermediate artificial intelligence engine as a target training data set;

employing the trained intermediate artificial intelligence engine to remove markers from each of the markered digital images of the target face of the first person to create, for each markered digital image, a corresponding synthetic markerless digital image of the target face of the first person;

converting each markered digital image of the target face of the first person into a training mapping to create a corresponding training mapping for each synthetic markerless digital image; and outputting a training data set for the artificial intelligence engine, the training data set comprising the synthetic markerless digital images of the target face of the first person and the corresponding training mappings.

2. A method according to aspect 1 or any other aspect herein wherein employing the trained intermediate artificial intelligence engine to remove markers from the markered digital images of the target face of the first person to create corresponding markerless digital images of the target face of the first person comprises:

cropping each of the markered digital images of the target face of the first person to create a plurality of tiles;

employing the trained intermediate artificial intelligence engine to remove markers from each of the plurality of tiles; and ensembling the plurality of tiles to create the corresponding markerless digital images of the target face of the first person.

3. A method according to aspect 2 or any other aspect herein wherein each of the plurality of tiles overlaps at least one other tile of the plurality of tiles.

4. A method according to any one of aspects 2 and 3 or any other aspect herein comprising ensembling the plurality of tiles by pixel-wise averaging to create the corresponding markerless digital images of the target face of the first person.

5. A method according to any one of aspects 1 to 4 or any other aspect herein wherein the intermediate artificial intelligence engine comprises a cyclic generative adversarial network.

6. A method according to any one of aspects 1 to 5 or any other aspect herein wherein the one or more skin parts comprise one or more skin parts of a second person.

7. A method according to any one of aspects 1 to 5 or any other aspect herein wherein the one or more skin parts comprise one or more skin parts of the first person.

8. A method according to aspect 7 or any other aspect herein wherein:
obtaining markerless digital images of the one or more skin parts comprises obtaining a plurality of different cropped portions of at least one markerless digital image of the target face of the first person; and
obtaining markered digital images of the one or more skin parts comprises obtaining a plurality of different cropped portions of at least one of the markered digital images of the target face of the first person.

9. A method according to any one of aspects 1 to 8 or any other aspect herein wherein training the intermediate artificial intelligence engine comprises providing, to the intermediate artificial intelligence engine, a correspondence between the markered digital images of the one or more skin parts and the markerless digital images of the one or more skin parts.

10. A method according to any one of aspects 1 to 9 or any other aspect herein wherein training the intermediate artificial intelligence engine comprises:
employing the untrained intermediate artificial intelligence engine to generate synthetic markerless digital images of the one or more skin parts, each corresponding to one of the markered digital images of the one or more skin parts;
assessing a quality of each of the synthetic markerless digital images of the one or more skin parts; and
updating the untrained intermediate artificial intelligence engine based at least in part on the assessment of the quality of each of the synthetic markerless digital images of the one or more skin parts.

11. A method according to any one of aspects 1 to 9 or any other aspect herein wherein training the intermediate artificial intelligence engine comprises:
(a) employing a generative network of the untrained intermediate artificial intelligence engine to create synthetic markerless digital images of the one or more skin parts, each corresponding to one of the markered digital images of the one or more skin parts;
(b) employing a discriminative network of the untrained intermediate artificial intelligence engine to predict if each of the synthetic markerless digital images of the one or more skin parts is synthetic;
(c) updating the untrained intermediate artificial intelligence engine based at least in part on each of the predictions of step (b); and
(d) repeating steps (a) to (c) until an error metric of the discriminative network of the untrained intermediate artificial intelligence engine is greater than a target training threshold.

12. A method for training an artificial intelligence engine operable to convert a markerless digital image of a target face into a mapping comprising a digital representation of the target face, the method comprising:
employing the method of any one of aspects 1 to 11;
training the artificial intelligence engine to obtain a trained artificial intelligence engine operable to convert a markerless digital image of the target face into a mapping comprising a digital representation of the target face, wherein training the artificial intelligence engine comprises:

providing the synthetic markerless digital images to the artificial intelligence engine as a source training data set;
providing the corresponding training mappings to the artificial intelligence engine as a target training data set.

13. A method according to aspect 12 or any other aspect herein wherein training the artificial intelligence engine comprises providing, to the artificial intelligence engine, a correspondence between the synthetic markerless digital images and the corresponding training mappings.

14. A method according to any one of aspects 12 and 13 or any other aspect herein wherein training the artificial intelligence engine comprises:
employing the untrained artificial intelligence engine to generate a plurality of synthetic mappings, each based on one of the synthetic markerless digital images of the target face;
assessing a quality of each of the plurality of synthetic mappings; and
updating the untrained intermediate artificial intelligence engine based at least in part on the assessment of the quality of each of the plurality of synthetic mappings.

15. A method according to any one of aspects 12 and 13 or any other aspect herein wherein training the artificial intelligence engine comprises:
(a) employing a generative network of the untrained artificial intelligence engine to create a plurality of synthetic mappings, each based on one of the synthetic markerless digital images of the target face;
(b) employing a discriminative network of the untrained artificial intelligence engine to predict if each of the plurality of synthetic mappings is synthetic;
(c) updating the untrained intermediate artificial intelligence engine based at least in part on each of the predictions of step (b); and
(c) repeating steps (a) to (c) until an error metric of discriminative network of the untrained artificial intelligence engine is greater than a target training threshold.

16. A method of creating an animation based on a plurality of markerless target digital images of a target face, the method comprising:
employing the artificial intelligence engine of any one of aspects 12 to 15 or any other aspect herein to convert the plurality of markerless target digital images of the target face into a plurality of corresponding target mappings, each comprising a digital representation of the target face;
creating an animation wherein each frame of the animation is based at least in part on one of the plurality of corresponding target mappings.

17. A method according to aspect 16 or any other aspect herein wherein a facial expression depicted in each frame of the animation is based at least in part on the one of the plurality of corresponding target mappings.

18. A method according to aspect 17 or any other aspect herein wherein the plurality of corresponding target mappings each comprise a plurality of blendshape weights and wherein each frame of the animation is based at least in part on a weighted linear combination of a plurality of blendshapes, wherein the weights of the weighted linear combination are based at least in part on the blendshape weights of the one of the plurality of corresponding target mappings.

19. A method according to aspect 17 or any other aspect herein wherein the plurality of corresponding target mappings each comprise a plurality of face shape weights and wherein each frame of the animation is based at least in part on a weighted linear combination of a plurality of face shapes, wherein the weights of the weighted linear combination are based at least in part on the face shape weights of the one of the plurality of corresponding target mappings.

20. A method according to aspect 17 or any other aspect herein wherein the plurality of corresponding target mappings each comprise a plurality of Facial Action Coding System action units and wherein each frame of the animation is based at least in part on a combination of the Facial Action Coding System action units of the one of the plurality of corresponding target mappings.

21. A method according to any one of aspect 16 to 20 or any other aspect herein wherein a facial expression depicted in each frame of the animation is based at least in part on the one of the plurality of corresponding target mappings.

22. A method according to any one of aspect 16 to 20 or any other aspect herein wherein creating each frame of the animation comprises employing an animation rig to render a facial expression depicted in the frame of animation based at least in part on the one of the mappings.

23. A system for preparing a training data set for an artificial intelligence engine operable to convert a markerless digital image of a target face into a mapping comprising a digital representation of the target face, the system comprises a processor configured (by suitable programming) to:

obtain markered digital images of the target face of a first person;

obtain markerless digital images of one or more skin parts;

obtain markered digital images of the one or more skin parts;

train an intermediate artificial intelligence engine to obtain a trained intermediate artificial intelligence engine operable to remove markers from markered digital images of skin, wherein training the intermediate artificial intelligence engine comprises:

providing the markered digital images of the one or more skin parts to the intermediate artificial intelligence engine as a source training data set; and providing the markerless digital images of the one or more skin parts to the intermediate artificial intelligence engine as a target training data set;

employ the trained intermediate artificial intelligence engine to remove markers from each of the markered digital images of the target face of the first person to create, for each markered digital image, a corresponding synthetic markerless digital image of the target face of the first person;

convert each markered digital image of the target face of the first person into a training mapping to create a corresponding training mapping for each synthetic markerless digital image; and output a training data set for the artificial intelligence engine, the training data set comprising the synthetic markerless digital images of the target face of the first person and the corresponding training mappings.

24. A system according to aspect 23 or any other aspect herein comprising any of the features, combinations of features and/or sub-combinations of features of any of aspects 2 to 11.

25. A system for training an artificial intelligence engine operable to convert a markerless digital image of a target face into a mapping comprising a digital representation of the target face, the system comprising a processor configured (by suitable programming) to:

employ the method of any one of aspects 1 to 11;

train the artificial intelligence engine to obtain a trained artificial intelligence engine operable to convert a markerless digital image of the target face into a mapping, wherein training the artificial intelligence engine comprises:

providing the synthetic markerless digital images to the artificial intelligence engine as a source training data set; and providing the corresponding training mappings to the artificial intelligence engine as a target training data set.

26. A system according to aspect 25 or any other aspect herein comprising any of the features, combinations of features and/or sub-combinations of features of any of aspects 13 to 15.

27. A system for creating an animation based on a plurality of markerless digital images of a target face, the system comprising a processor configured (by suitable programming) to:

employ the artificial intelligence engine of any one of aspects 12 to 15 or any other aspect herein to convert the plurality of markerless digital images of the target face into a plurality of corresponding target mappings, each comprising a digital representation of the target face;

create an animation wherein each frame of the animation is based at least in part on one of the plurality of corresponding target mappings.

28. A system according to aspect 27 or any other aspect herein comprising any of the features, combinations of features and/or sub-combinations of features of any of aspects 16 to 22.

29. A computer program product embodied on a non-transitory computer readable medium having stored thereon software instructions that, when executed by a processor, cause the processor to perform any of the methods of any of aspects 1 to 22.

30. Methods comprising any features, combinations of features and/or sub-combinations of features described herein or inferable therefrom.

31. Apparatus comprising any features, combinations of features and/or sub-combinations of features described herein or inferable therefrom.

32. Kits comprising any features, combinations of features and/or sub-combinations of features described herein or inferable therefrom.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The invention claimed is:

1. A method for preparing a training data set for an artificial intelligence engine operable to convert markerless images of a target face into a mapping comprising a digital representation of the target face, the method comprising;

obtaining, using one or more first image capture devices, markered digital images of the target face of a first person;

obtaining, using one or more second image capture devices, markerless digital images of one or more skin parts;

obtaining, using one or more third image capture devices, markered digital images of the one or more skin parts;

training an intermediate artificial intelligence engine embodied by one or more processors to obtain a trained intermediate artificial intelligence engine operable to remove markers from markered digital images of skin, wherein training the intermediate artificial intelligence engine comprises:

providing the markered digital images of the one or more skin parts to the one or more processors as a source training data set for the intermediate artificial intelligence engine; and providing the markerless digital images of the one or more skin parts to the one or more processors as a target training data set for the intermediate artificial intelligence engine;

employing the trained intermediate artificial intelligence engine embodied by the one or more processors to remove markers from each of the markered digital images of the target face of the first person to create, for each markered digital image, a corresponding synthetic markerless digital image of the target face of the first person;

converting each markered digital image of the target face of the first person into a training mapping to create a corresponding training mapping for each synthetic markerless digital image; and providing a training data set to the artificial intelligence engine, the training data set comprising labelled pairs of the synthetic markerless digital images of the target face of the first person and the corresponding training mappings, and thereby training the artificial intelligence engine to convert markerless images of the target face into a mapping comprising a digital representation of the target face.

2. A method according to claim 1 wherein employing the trained intermediate artificial intelligence engine to remove markers from the markered digital images of the target face of the first person to create corresponding markerless digital images of the target face of the first person comprises:

cropping each of the markered digital images of the target face of the first person to create a plurality of tiles;

employing the trained intermediate artificial intelligence engine to remove markers from each of the plurality of tiles; and ensembling the plurality of tiles to create the corresponding markerless digital images of the target face of the first person.

3. A method according to claim 2 wherein each of the plurality of tiles overlaps at least one other tile of the plurality of tiles.

4. A method according to claim 2 comprising ensembling the plurality of tiles by pixel-wise averaging to create the corresponding markerless digital images of the target face of the first person.

5. A method according to claim 1 wherein the intermediate artificial intelligence engine comprises a cyclic generative adversarial network.

6. A method according to claim 1 wherein the one or more skin parts comprise one or more skin parts of a second person.

7. A method according to claim 1 wherein the one or more skin parts comprise one or more skin parts of the first person.

8. A method according to claim 7 wherein:

obtaining markerless digital images of the one or more skin parts comprises obtaining a plurality of different cropped portions of at least one markerless digital image of the target face of the first person; and obtaining markered digital images of the one or more skin parts comprises obtaining a plurality of different cropped portions of at least one of the markered digital images of the target face of the first person.

9. A method according to claim 1 wherein training the intermediate artificial intelligence engine comprises providing, to the intermediate artificial intelligence engine, a correspondence between the markered digital images of the one or more skin parts and the markerless digital images of the one or more skin parts.

10. A method according to claim 1 wherein training the intermediate artificial intelligence engine comprises:

employing the untrained intermediate artificial intelligence engine to generate synthetic markerless digital images of the one or more skin parts, each corresponding to one of the markered digital images of the one or more skin parts;

assessing a quality of each of the synthetic markerless digital images of the one or more skin parts; and updating the untrained intermediate artificial intelligence engine based at least in part on the assessment of the quality of each of the synthetic markerless digital images of the one or more skin parts.

11. A method according to claim 1 wherein training the intermediate artificial intelligence engine comprises:

(a) employing a generative network of the untrained intermediate artificial intelligence engine to create synthetic markerless digital images of the one or more skin parts, each corresponding to one of the markered digital images of the one or more skin parts;

(b) employing a discriminative network of the untrained intermediate artificial intelligence engine to predict if each of the synthetic markerless digital images of the one or more skin parts is synthetic;

(c) updating the untrained intermediate artificial intelligence engine based at least in part on each of the predictions of step (b); and (d) repeating steps (a) to (c) until an error metric of the discriminative network of the untrained intermediate artificial intelligence engine is greater than a target training threshold.

12. A method for training an artificial intelligence engine operable to convert a markerless digital image of a target face into a mapping comprising a digital representation of the target face, the method comprising:

preparing a training data set for the artificial intelligence engine, wherein preparing the training data set comprises:

obtaining, using one or more first image capture devices, markered digital images of the target face of a first person;

obtaining, using one or more second image capture devices, markerless digital images of one or more skin parts;

obtaining, using one or more third image capture devices, markered digital images of the one or more skin parts;

training an intermediate artificial intelligence engine embodied by one or more processors to obtain a trained intermediate artificial intelligence engine operable to remove markers from markered digital images of skin, wherein training the intermediate artificial intelligence engine comprises:

providing the markered digital images of the one or more skin parts to the one or more processors as a source training data set for the intermediate artificial intelligence engine; and providing the markerless digital images of the one or more skin parts to the one or more processors as a target training data set for the intermediate artificial intelligence engine;

employing the trained intermediate artificial intelligence engine embodied by the one or more processors to remove markers from each of the markered digital images of the target face of the first person to create, for each markered digital image, a corresponding synthetic markerless digital image of the target face of the first person; and converting each markered digital image of the target face of the first person into a training mapping to create a corresponding training mapping for each synthetic markerless digital image; and providing the training data set to the artificial intelligence engine, the training data set comprising labelled pairs of the synthetic markerless digital images of the target face of the first person and the corresponding training mappings;

training the artificial intelligence engine to obtain a trained artificial intelligence engine operable to convert a markerless digital image of the target face into a mapping comprising a digital representation of the target face, wherein training the artificial intelligence engine comprises:

providing the synthetic markerless digital images to the artificial intelligence engine as a source training data set;

providing the corresponding training mappings to the artificial intelligence engine as a target training data set.

13. A method according to claim 1 wherein at least two of the one or more first image captured devices, the one or more second image capture devices and the one or more third image capture devices are the same one or more image capture devices.

14. A method according to claim 12 wherein training the artificial intelligence engine comprises:

employing the untrained artificial intelligence engine to generate a plurality of synthetic mappings, each based on one of the synthetic markerless digital images of the target face;

assessing a quality of each of the plurality of synthetic mappings; and updating the untrained intermediate artificial intelligence engine based at least in part on the assessment of the quality of each of the plurality of synthetic mappings.

15. A method according to claim 12 wherein training the artificial intelligence engine comprises:

(a) employing a generative network of the untrained artificial intelligence engine to create a plurality of synthetic mappings, each based on one of the synthetic markerless digital images of the target face;

(b) employing a discriminative network of the untrained artificial intelligence engine to predict if each of the plurality of synthetic mappings is synthetic;

(c) updating the untrained intermediate artificial intelligence engine based at least in part on each of the predictions of step (b); and (d) repeating steps (a) to (c) until an error metric of discriminative network of the untrained artificial intelligence engine is greater than a target training threshold.

16. A method of creating an animation based on a plurality of markerless target digital images of a target face, the method comprising:

preparing a training data set for an artificial intelligence engine, wherein preparing the training data set comprises:

obtaining, using one or more first image capture devices, markered digital images of the target face of a first person;

obtaining, using one or more second image capture devices, markerless digital images of one or more skin parts;

obtaining, using one or more third image capture devices, markered digital images of the one or more skin parts;

training an intermediate artificial intelligence engine embodied by one or more processors to obtain a trained intermediate artificial intelligence engine operable to remove markers from markered digital images of skin, wherein training the intermediate artificial intelligence engine comprises:

providing the markered digital images of the one or more skin parts to the one or more processors as a source training data set for the intermediate artificial intelligence engine; and providing the markerless digital images of the one or more skin parts to the one or more processors as a target training data set for the intermediate artificial intelligence engine;

employing the trained intermediate artificial intelligence engine embodied by the one or more processors to remove markers from each of the markered digital images of the target face of the first person to create, for each markered digital image, a corresponding synthetic markerless digital image of the target face of the first person; and converting each markered digital image of the target face of the first person into a training mapping to create a corresponding training mapping for each synthetic markerless digital image; and providing the training data set to the artificial intelligence engine, the training data set comprising labelled pairs of the synthetic markerless digital images of the target face of the first person as source training data and the corresponding training mappings as target training data;

training, using the training data set, the artificial intelligence engine to convert markerless digital image of the target face into mappings comprising digital representations of the target face;

converting, using the trained artificial intelligence engine, the plurality of markerless target digital images of the target face into a plurality of corresponding target mappings, each comprising a digital representation of the target face;

creating an animation wherein each frame of the animation is based at least in part on one of the plurality of corresponding target mappings.

17. A method according to claim 16 wherein a facial expression depicted in each frame of the animation is based at least in part on the one of the plurality of corresponding target mappings.

18. A method according to claim 17 wherein the plurality of corresponding target mappings each comprise a plurality of blendshape weights and wherein each frame of the animation is based at least in part on a weighted linear combination of a plurality of blendshapes, wherein the weights of the weighted linear combination are based at least in part on the blendshape weights of the one of the plurality of corresponding target mappings.

19. A method according to claim 17 wherein the plurality of corresponding target mappings each comprise a plurality of face shape weights and wherein each frame of the animation is based at least in part on a weighted linear combination of a plurality of face shapes, wherein the weights of the weighted linear combination are based at least in part on the face shape weights of the one of the plurality of corresponding target mappings.

20. A system for preparing a training data set for an artificial intelligence engine operable to convert a markerless digital image of a target face into a mapping comprising a digital representation of the target face, the system comprises:

one or more first image capture devices for obtaining markered digital images of the target face of a first person;

one or more second image capture devices for obtaining markerless digital images of one or more skin parts;

one or more third image capture devices for obtaining markered digital images of the one or more skin parts;

a processor connected to receive, from the one or more first, second and third image capture devices, the markered digital images of the target face of a first person, the markerless digital images of one or more skin parts and the markered digital images of the one or more skin parts;

the processor configured to:

train an intermediate artificial intelligence engine embodied by the processor to obtain a trained intermediate artificial intelligence engine operable to remove markers from markered digital images of skin, wherein training the intermediate artificial intelligence engine comprises:

providing the markered digital images of the one or more skin parts to the processor as a source training data set for the intermediate artificial intelligence engine; and providing the markerless digital images of the one or more skin parts to the processor as a target training data set for the intermediate artificial intelligence engine;

employ the trained intermediate artificial intelligence engine embodied by the processor to remove markers from each of the markered digital images of the target face of the first person to create, for each markered digital image, a corresponding one of the synthetic markerless digital images of the target face of the first person;

convert each markered digital image of the target face of the first person into a training mapping to create a corresponding training mapping for each synthetic markerless digital image; and provide a training data set to the artificial intelligence engine, the training data set comprising labelled pairs of the synthetic markerless digital images of the target face of the first person and the corresponding training mappings to thereby train the artificial intelligence engine to convert markerless images of the target face into a mapping comprising a digital representation of the target face.

* * * * *